3,740,277

DEFLAGRATIVE CIRCUIT BOARD MATERIAL

Clyde J. Poulin, Phoenix, Ariz., and Theodore N. Bryla, Glendora, Calif., assignors to the United States of America as represented by the Secretary of the Navy No Drawing. Filed Feb. 8, 1971, Ser. No. 113,704
Int. Cl. C06c 3/10
U.S. Cl. 149—15 4 Claims

ABSTRACT OF THE DISCLOSURE

A self-destructive circuit board, which will deny knowledge to an enemy by destroying the actual hardware elements mounted thereon, made of a composition which burns at such high temperature that all metal and other solid components are completely destroyed.

The invention herein described may be manufactured and used by or for the Government of the United States of America for governmental purposes without the payment of any royalties thereon or therefor.

This invention is related to copending U.S. patent application Ser. No. 113,705 for Deflagrative Electronic Component Potting Compound, and U.S. patent application Ser. No. 113,749 for Deflagrative Epoxy Foam Material both filed together herewith on Feb. 8, 1971.

The denying of knowledge of an electronic circuit to an enemy through destruction of the actual circuit hardware by means of an outside energy source, has been employed in various forms by military establishments for a number of years. However, the circuit board upon which are mounted components and which contains circuit track can be made self-destructible by fabricating them from a fuel, oxidizer, and binder formulation, thus eliminating an outside energy source requirement for destruction purposes.

The present invention provides such a self-destruct circuit board. The board is a composition of combustible metal such as boron, magnesium, potassium perchlorate as a powerful oxidizer, glass beads, epoxy resins for bonding particles together, etc.

It is an object of the invention to provide a deflagrative circuit board material with a fast burning rate, complete destruct capabilities and excellent machinability.

Other objects and many of the attendant advantages of this invention will become readily appreciated as the same becomes better understood by reference to the following detailed description wherein:

The circuit board composition of this invention is comprised of the following mixture:

9% by weight of 3 micron particle size boron,

18% by weight of 18 micron particle size magnesium,

33% by weight of 8 micron particle size potassium perchlorate,

15% by weight of 1 to 40 micron size glass beads, 8.3% by weight of liquid deglycidyl ester of bisphenyl A, epoxide equivalent=185–192 (e.g. Epon resin 828—Shell Oil Co.), 12.6% by weight of liquid diglycidyl ester of linoleic dimer acid, epoxide equivalent=390–470 (e.g. Epon resin 871—Shell Oil Co.), 3.8% by weight of aromatic amine type curing agent (modified polyamine) (e.g. Curing agent Z by Shell Chemical Co.), 0.3% by weight of beta 3,4 (epoxy cyclohexyl) ethyltrimethoxysilane coupling agent (e.g. Silane A–186 by Union Carbide Chemical Co.), (the last four ingredients comprise 25% by weight of hardenable epoxy resins).

The circuit board is cured for 1 hour at 200° F. followed by 1 hour at 300° F.

The average properties of this deflagrative composition are given in the following table:

AVERAGE PROPERTIES

| Property | MIL-P-13949 type PH and PX (paper base-epoxy) | UMC I-L-4 |
|---|---|---|
| Volume resistivity (megohm-cm.). | $10^5$ ambient | $2.6 \times 10^6$ |
| Surface resisitivity (megohm). | $10^4$ ambient | $1.1 \times 10^6$ |
| Water absorption | 0.65 | 0.43 |
| Flammability | N/A | 26 in./min. (ambient); 180 in./min. (confined) |
| Autoignition temp | N/A | >800° F. |
| Calorific output | N/A | 1.2 kcd./gm. |

The glass beads used in the composition also increases the flexural strength of the deflagrative circuit board. The flexural strength of the circuit board can be further improved by the use of two sheets of pyrotechnic impregnated glass cloth positioned on the outer surfaces of the circuit board. Previous self-destructing circuit boards employ an inert commercial glass cloth prepreg (i.e. glass cloth embedded with partially cured resin) which does not add to the destruct, and in fact, acts as a heat sink thus, reducing the burn rate and impairing the destruct. Treated glass cloth as used in this invention enhances the destruct action and aids in obtaining a fast burn rate.

The treated glass cloth, as used herein, is prepared by taking a portion of the uncured formulation given above, adding 35% xylene solvent and 0.7% gelling agent (such as Cab-O-Sil M5) and brushing the resultant thixotropic mixture on woven glass cloth of 0.001 thickness. The treated cloth is then heated sufficiently to drive off the solvent. The copper foil from which a circuit track is etched. the treated glass cloth, and the main circuit board uncured composition are pressed together in a mold to a thickness of 1/16" in one operation. Appropriate heat is applied to the mold for a period of time to effect curing of the board, as aforementioned.

The pyrotechnic based self-destructible circuit board discussed herein meets the mechanical and electrical performance parameters of commonly used paper based-epoxy circuit boards meeting military specifications. The formulation can be adjusted to produce materials whereby the burning rate can be varied from 0.2 inch per second to 3.0 inch per second. Known deflagrative materials of slower burning rate are unsuitable for some anti-compromise destruct applications.

The present deflagrative circuit board material when burning at from ambient to 3000 p.s.i.a. is pressure insensitive. The burning rate exponent is 0.70, which is an important criteria in design of a non-catastrophic destruct system, to prevent high order deflagration or detonation of the material when in a highly confined area.

The deflagrative circuit board material can be ignited by hot wire, pyro fuze or electric squib techniques by embedding or placing initiating materials into or adjacent the deflagrative material. The material will then burn non-catastrophically at a controlled rate at ambient and high pressures to completely destroy and reduce printed copper circuitry, inorganic and organic materials used in construction of the circuit board to friable ash.

What is claimed is:

1. A deflagrative circuit board material which upon ignition has the capabilities of complete destruct of electronic components mounted thereon, consisting of the mixture of:

9% by weight of 3 micron particle size boron,

18% by weight of 18 micron particle size magnesium,

33% by weight of 8 micron particle size potassium perchlorate,

15% by weight of 1 to 40 micron size glass beads, and

25% by weight hardenable epoxy resin.

2. A deflagrative circuit as in claim 1 cured at 200° F. for 1 hour followed by 300° F. for 1 hour.

3. A circuit board as in claim 1 provided with pyrotechnic impregnated glass cloth on the outer surfaces thereof.

4. A circuit board composition as in claim 1 wherein the 25% by weight hardenable epoxy resin consists of:

8.3% by weight of liquid diglycidyl ester of bisphenyl A, 12.6% by weight of liquid diglycidyl ester of linoleic dimer acid, 3.8% by weight of aromatic amine type curing agent, and 0.3% by weight of beta 3,4 (epoxy cyclohexyl) ethyltrimethoxysilane coupling agent.

References Cited

UNITED STATES PATENTS

| | | | |
|---|---|---|---|
| 3,294,602 | 12/1966 | Francis et al. | 149—15 X |
| 3,301,187 | 1/1967 | Donaldson et al. | 149—19 X |
| 3,513,776 | 5/1970 | Driscoll | 149—19 X |

STEPHEN J. LECHERT, Jr., Primary Examiner

U.S. Cl. X.R.

149—19, 20, 21, 22, 42, 44, 85, 110, 113, 114; 109—36; 174—68.5